(12) United States Patent
Bittlingmaier

(10) Patent No.: US 12,072,001 B2
(45) Date of Patent: Aug. 27, 2024

(54) AXLE DRIVE

(71) Applicant: Kessler & Co. GmbH & Co. KG, Abtsgmünd (DE)

(72) Inventor: Günter Bittlingmaier, Aalen-Ebnat (DE)

(73) Assignee: Kessler & Co. GmbH & Co. KG, Abtsgmünd (DE)

( * ) Notice: Subject to any disclaimer, the term of this patent is extended or adjusted under 35 U.S.C. 154(b) by 0 days.

(21) Appl. No.: 17/915,150

(22) PCT Filed: Mar. 24, 2021

(86) PCT No.: PCT/EP2021/057622
§ 371 (c)(1),
(2) Date: Sep. 28, 2022

(87) PCT Pub. No.: WO2021/197973
PCT Pub. Date: Oct. 7, 2021

(65) Prior Publication Data
US 2023/0113055 A1    Apr. 13, 2023

(30) Foreign Application Priority Data

Apr. 1, 2020   (DE) .......................... 102020109116.8

(51) Int. Cl.
*B60K 1/00*           (2006.01)
*F16H 1/12*           (2006.01)
(Continued)

(52) U.S. Cl.
CPC .................. *F16H 1/12* (2013.01); *B60K 1/00* (2013.01); *F16H 37/0813* (2013.01);
(Continued)

(58) Field of Classification Search
CPC ... B60K 1/00–02; F16H 1/12; F16H 37/0813; F16H 57/021; F16H 57/023;
(Continued)

(56) References Cited

U.S. PATENT DOCUMENTS 8,424,625 B2   4/2013   Ishii
9,242,544 B2   1/2016   Kochidomari et al.
(Continued)

FOREIGN PATENT DOCUMENTS

CN   203580592 U  *  5/2014
DE   102017112405 A1 * 12/2018   ............... B60K 1/00
(Continued)

*Primary Examiner* — Ernesto A Suarez
*Assistant Examiner* — James J Taylor, II
(74) *Attorney, Agent, or Firm* — Dickinson Wright PLLC

(57) ABSTRACT

An axle drive for a vehicle includes at least one drivable vehicle axle oriented transversely to a longitudinal direction of the vehicle. A drive shaft extends parallel with the longitudinal direction and receives drive power from an electric motor at an input section and outputs said drive power at an output section. A driven shaft extends parallel with the drive shaft and receives drive power from the output section of the drive shaft at an input section and outputs said drive power to the vehicle axle via a bevel gear arranged at a first end of the driven shaft. A brake, in particular a parking brake, includes a brake disk arranged at a second end of the driven shaft and between the input section of the drive shaft and the input section of the driven shaft with respect to the longitudinal direction.

19 Claims, 5 Drawing Sheets

Figure 1:
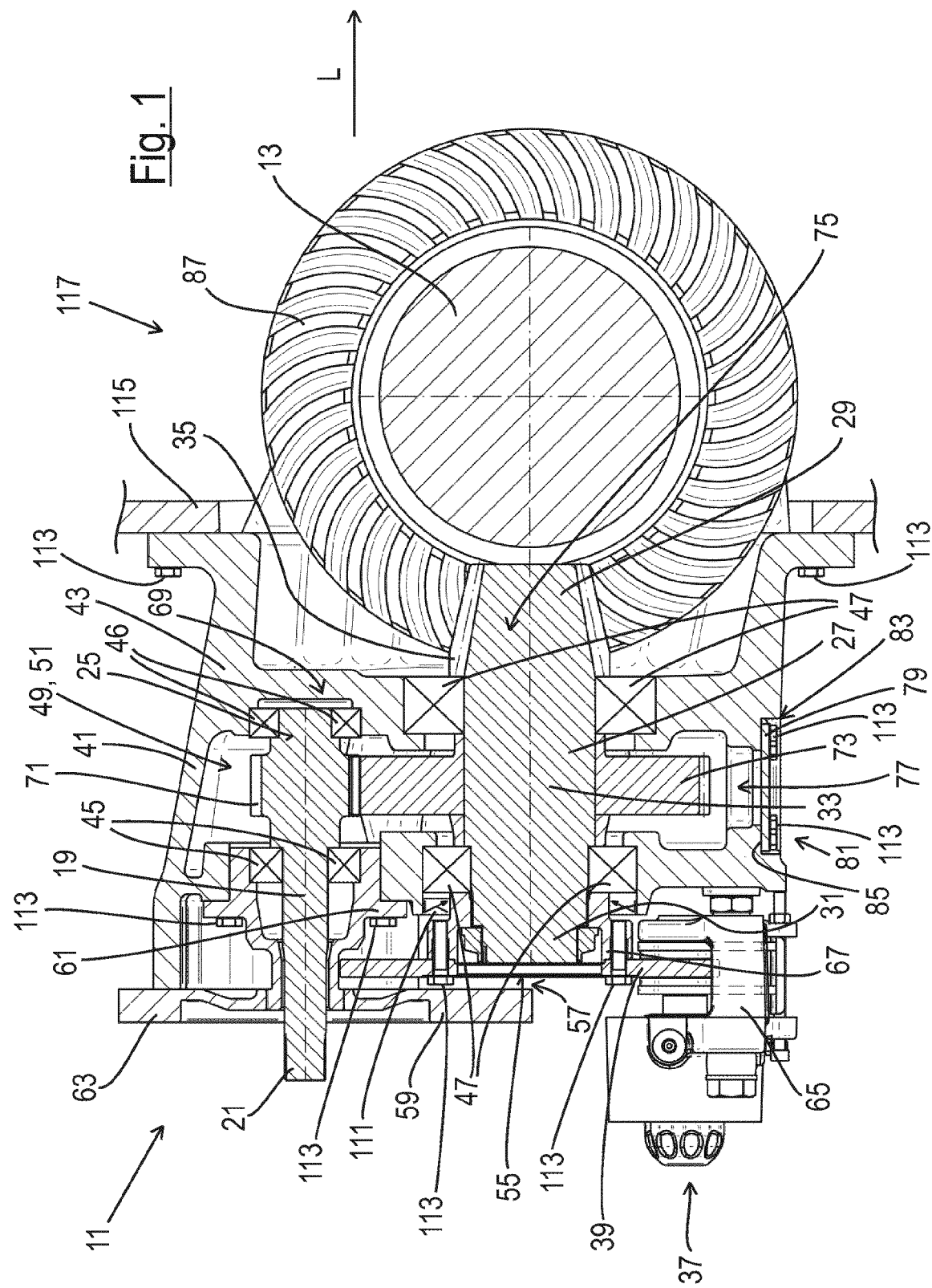

(51) Int. Cl.
*F16H 37/08* (2006.01)
*F16H 57/02* (2012.01)
*F16H 57/021* (2012.01)
*F16H 57/023* (2012.01)
*F16H 57/038* (2012.01)
*F16H 57/04* (2010.01)
*F16H 63/34* (2006.01)

(52) U.S. Cl.
CPC ......... *F16H 57/021* (2013.01); *F16H 57/023* (2013.01); *F16H 57/038* (2013.01); *F16H 57/0421* (2013.01); *F16H 57/0495* (2013.01); *F16H 63/345* (2013.01); *B60K 2001/001* (2013.01); *F16H 2057/02034* (2013.01); *F16H 2057/02052* (2013.01)

(58) Field of Classification Search
CPC ............... F16H 57/038; F16H 57/0421; F16H 57/0495; F16H 63/3416–3491; F16H 2057/02034; F16H 2057/02052
See application file for complete search history.

(56) References Cited

U.S. PATENT DOCUMENTS

| | | |
|---|---|---|
| 2013/0019707 A1 | 1/2013 | Ebihara et al. |
| 2019/0270367 A1 | 9/2019 | Pydin |
| 2020/0189375 A1* | 6/2020 | Hayashi ................. F16H 57/02 |
| 2022/0314789 A1* | 10/2022 | Grimminger ........ B60K 17/046 |

FOREIGN PATENT DOCUMENTS

| | | |
|---|---|---|
| EP | 2479053 A1 | 7/2012 |
| EP | 3501867 A1 * | 6/2019 |
| EP | 3597463 A1 | 1/2020 |

* cited by examiner

AXLE DRIVE

CROSS-REFERENCE TO RELATED APPLICATIONS

This application is a U.S. National Stage of International Application No. PCT/EP2021/057622, filed on Mar. 24, 2021, which claims the benefit and priority of German Patent Application No. DE 10 2020 109 116.8, filed on Apr. 1, 2020, the entire contents of which are incorporated herein by reference.

The invention relates to an axle drive for a vehicle comprising at least one drivable vehicle axle oriented transversely to a longitudinal direction of the vehicle.

Such an axle drive may, for example, be arranged at a front axle or at a rear axle of a vehicle in order to at least partly transmit drive power received from a motor to a drivable vehicle axle and to set the vehicle into motion. In this respect, an axle drive may have at least one shaft that transmits the received drive power to the vehicle axle, for which purpose the shaft may, for example, be rotationally effectively coupled to the vehicle axle via a bevel gear. In order furthermore to be able to drive the vehicle axle at a desired rotational speed or to be able to apply a required torque, an axle drive may, for example, have a plurality of shafts that are connected to one another via at least one gear stage. This may make it possible to transmit a rotational speed or a torque generated by a motor in a manner adapted to a respective vehicle or to a respective operating situation.

However, there is generally the problem with an axle drive that the installation space in the region of the vehicle axle or beneath the vehicle is very limited and a compact design of the axle drive is therefore required. Accordingly, it is always endeavored both to limit the number of components of the axle drive and to achieve as space-saving arrangements as possible of these components. However, it may be necessary or desired to configure an axle drive with a brake and in particular a parking brake to be able to provide a parking function and ensure a safe standstill of the vehicle such that an unwanted rolling away, for example while the vehicle is parked, may be ruled out as far as possible. In particular in commercial vehicles, for example, trucks, fork-lift trucks or dump trucks, such brakes may be necessary to be able to reliably prevent a movement or a rolling away of the vehicle during a loading. Such a brake may also satisfy an emergency braking function in addition to the typical service brakes of the vehicle, in particular when it automatically closes on a drop in the operating pressure. However, the configuration of an axle drive with a brake is usually accompanied by a corresponding increase in the installation space occupied by the axle drive. Such brakes may in particular be configured with brake disks that may frequently have a relatively large extent or a large diameter in order, in particular in the case of heavy vehicles, for example commercial vehicles that are loaded or to be loaded, to be able to develop a sufficient braking effect for stopping the vehicle. However, this increase of the axle drive may, due to the limited installation space in the region of the vehicle axle, make the installation of such an axle drive comprising a brake more difficult or preclude it.

In addition to this expansion of the axle drive by a configuration with a brake disk, the problem in particular arises on the use of electric motors for transmitting drive power that the required electric motors, which are likewise of compact design, often generate very high rotational speeds and the brake disk may thus likewise be accelerated to high rotational speeds during a trip with the vehicle. This may, in particular in view of the usually large diameter of such brake disks, lead to unwanted vibrations of the brake disk and to a noise generation that is thereby caused and that has a disadvantageous effect on the driving comfort and that may possibly also result in instabilities of the axle drive or of the drive train of the vehicle.

It is therefore an object of the invention to provide an axle drive comprising a brake, in particular a parking brake, said axle drive enabling the reception of drive power from fast-rotating electric motors with an improved acoustic behavior of a brake disk of the brake and having a very compact design.

This object is satisfied by an axle drive having the features of claim 1 and in particular in that the axle drive comprises a drive shaft that extends in parallel with the longitudinal direction of the vehicle and that is configured to receive drive power from an electric motor at an input section and to output said drive power at an output section; in that the axle drive comprises a driven shaft that extends offset from the drive shaft in parallel with the longitudinal direction of the vehicle between a first end and a second end opposite thereto and that is configured to receive drive power from the output section of the drive shaft at an input section and to output said drive power to the vehicle axle via a bevel gear arranged at the first end; and in that the axle drive comprises a brake, in particular a parking brake, having a brake disk that is arranged at the second end of the driven shaft and that is arranged between the input section of the drive shaft and the input section of the driven shaft with respect to the longitudinal direction of the vehicle. The vehicle axis is in this respect oriented transversely, in particular at least substantially perpendicular, to the longitudinal direction of the vehicle.

Since the drive shaft and the driven shaft are aligned in parallel with the longitudinal direction of the vehicle, the extent of the axle drive may also be concentrated along this longitudinal direction and may thus usually be concentrated in the direction of the greatest extent of the vehicle. The extent of the axle drive in parallel with the vehicle axle may, in contrast, be minimized such that, for example, the space between two wheels arranged at the ends of the vehicle axle may be kept free as far as possible and the axle drive does not impair or limit a deflection of the wheels.

In this respect, the input section of the drive shaft, which is provided for receiving drive power, may in particular be an end section of the drive shaft that may, for example, be formed by a flange or be connected to a flange to be able to connect an electric motor or its motor shaft. The drive shaft may in this respect be formed in one part such that the electric motor may be directly connected to the input section of the drive shaft, for example via a flange, to transmit drive power to the input section and the drive shaft. Furthermore, it is also possible for the drive shaft to comprise a plurality of part shafts, which may, for example, be rotationally fixedly connected to one another via plug-in connections, such that a rotation may be transmitted between the part shafts without changing the rotational speed. The input section of such multi-part drive shafts is in this respect likewise given by that section which the electric motor directly adjoins or at which a clear deflection of the drive power flow, which deflection is in particular not based on production tolerances, from a direction in parallel with the longitudinal direction of the vehicle takes place. In general, a motor shaft that extends out of an electric motor and that is at least substantially coaxially connected to a further part shaft of the drive shaft within the axle drive may thus in particular also be regarded as a part shaft of the drive shaft and have its input section.

Since the brake disk of the brake, which may in particular be rotationally fixedly connected to the driven shaft at the second end, is arranged between the input section of the drive shaft and the input section of the driven shaft, a high integration of the brake disk into the axle drive takes place and the brake disk does not cause a relevant increase in the axle drive along the longitudinal direction. Due to the parallel offset between the drive shaft and the driven shaft, a brake disk having a radius corresponding at least approximately to this offset may further be arranged at the driven shaft, wherein the installation space additionally occupied by the axle drive in a radial direction with respect to the driven shaft for attaching the brake disk only approximately corresponds to the single radius of the brake disk in this respect. Thus, relatively large brake disks for holding heavy vehicles or for applying large torques may also be arranged in a space-saving and compact manner. In this respect, the brake disk may, for example, be directly attached to the driven shaft or may be rotationally effectively or brake-effectively connected to the driven shaft via a holder.

Furthermore, the configuration of the axle drive with two shafts offset in parallel from one another makes it possible to use the driven shaft in the manner of a countershaft such that a speed reduction stage may in particular be provided between the output section of the drive shaft and the input section of the driven shaft and a rotation of the drive shaft may be transmitted in a speed-reduced or slowed-down manner to the driven shaft. The rotational speed level of the brake disk may thereby also be lowered relative to the drive shaft such that compact and fast-rotating electric motors may be used to provide the drive power without the brake disk also being subjected to such fast rotations. A noise formation due to vibrations of the brake disk at high rotational speeds and possible instabilities of the axle drive due to such vibrations may thus be avoided and the acoustic behavior of the brake disk or of the axle drive may be improved.

The brake may in particular act as a parking brake and may be provided to reliably secure the vehicle against rolling away when stationary. For this purpose, the brake may, for example, have a brake caliper that engages around the brake disk and that may be configured to hold the brake disk when the vehicle is stationary in order to block a rotation of the brake disk, of the driven shaft connected thereto, and thus also of the vehicle axle coupled to the driven shaft via the bevel gear. In this respect, the brake caliper may in particular engage at a section of the brake disk that is a radially outer section with respect to the driven shaft to be able to apply as large a braking torque as possible or to be able to compensate as large a torque as possible that us conducted via the vehicle axle to the driven shaft.

Alternatively or additionally to such a brake serving as a parking brake, provision may also be made to equip the axle drive with an emergency braking function through the brake. For example, a brake caliper may be able to be actively brought out of engagement with the brake disk during a driving with the vehicle in order to enable a rotation of the brake disk together with the driven shaft, while, on an absence of the required action or of a signal necessary therefor, the brake caliper may automatically come into engagement with the brake disk to brake the vehicle. For this purpose, the brake caliper may in particular comprise a piston that may be acted on or is acted on by pressure during the travel, wherein the brake caliper may automatically come into engagement with the brake disk on the absence of the pressure acting on the piston. On a possible failure of a vehicle system or of a motor providing energy for generating the pressure, for example of the electric motor for driving the vehicle axle, an engagement of the brake caliper into the brake disk and a braking of the vehicle resulting therefrom may thereby be automatically achieved such that the vehicle may be reliably secured against such failures and may quickly be brought to a standstill in emergency situations. Such a brake provided as an emergency brake may generally also be used or understood as a parking brake in that the action for releasing the brake caliper may in particular also be deliberately omitted when the vehicle is stationary in order to secure the vehicle against rolling away in the sense of a parking brake.

Provision may be made that the drive shaft is configured to directly receive drive power from an electric motor at the input section, for example via a flange. However, an indirect transmission may also be provided such that the drive power output by the electric motor may, for example, be transmitted to the input section of the drive shaft via gear stages or deflections. Similarly, the output of the drive power at the output section, which may in particular be an end section of the drive shaft, may take place directly or indirectly to the input section of the driven shaft. For this purpose, one or more spur gear sets may, for example, be provided between the drive shaft and the driven shaft, by which spur gear sets the offset between said shafts may in particular also be achieved. In this respect, such a spur gear set may be configured such that a rotation of the drive shaft is transmitted in a speed-reduced or slowed-down manner to the driven shaft.

Furthermore, provision may be made that drive power received from the electric motor is only partly transmitted to the input section of the driven shaft at the output section, while a further portion of the drive power is transmitted elsewhere and is, for example, transmitted to a possibly provided second drivable vehicle axle. Similarly, only a proportional transmission of drive power to the vehicle axle may also take place by means of the bevel gear arranged at the first end of the drive shaft, while a further portion is transmitted elsewhere. In general, however, the axle drive disclosed herein is configured such that drive power received from an electric motor at the input section of the drive shaft is at least partly output to the drivable vehicle axle via the bevel gear arranged at the first end of the driven shaft.

Possible embodiments of the invention can be seen from the dependent claims, from the description, and from the drawings.

In some embodiments, the axle drive may further comprise a housing in which the drive shaft and the driven shaft are received, wherein the output section of the drive shaft and the input section of the driven shaft are arranged within the housing. Consequently, the drive shaft and the driven shaft may indeed extend partly out of the housing, wherein, however, at least the transmission of the drive power from the output section of the drive shaft to the input section of the driven shaft takes place within the housing. In this respect, the bevel gear arranged at the first end of the driven shaft may in particular be arranged within the housing. In general, the bevel gear may also extend at least partly out of the housing to transmit the drive power to the vehicle axle. Alternatively thereto, the bevel gear may also be arranged completely outside the housing, wherein the driven shaft then extends out of the housing with its first end.

The driven shaft may in particular extend out of the housing with its second end such that the brake disk may be arranged outside the housing. The input section of the drive shaft may also be arranged outside the housing to enable a connection of an electric motor. Furthermore, the drive shaft may generally extend beyond the output section in order, for example, to only partly transmit drive power received at the input section via the output section to the input section of the driven shaft and to conduct a further portion of the drive power out of the housing.

Furthermore, in some embodiments, the housing may have a bearing section integrally formed in one part or be formed by a bearing section which is integrally formed in one part, wherein bearings for supporting the drive shaft and/or the driven shaft are supported at the bearing section. In this respect, all the bearings for supporting the drive shaft and/or the driven shaft may in particular be supported at this bearing section integrally formed in one part.

The support points for supporting the drive shaft and the driven shaft may be oriented exactly in alignment with one another by a bearing section integrally formed in one part, which may in particular be configured as a single bonded component, to be able to prevent any inaccuracies or imbalances, in particular on the use of fast-rotating electric motors, and to be able to handle the high rotational speeds. In this respect, the bearings may in particular be directly supported at the bearing section. However, provision may also be made that the support of at least some of the bearings takes place at a further housing part that may be precisely aligned with the bearing section. Such bearings are in this respect also at least indirectly supported at the bearing section integrally formed in one part such that the exact positioning of these bearings may also be ensured on a precise alignment of the further housing part with the bearing section. In the case of such an indirect support of at least some of the bearings, these bearings are preferably supported in the radial direction at the bearing section integrally formed in one part with respect to the axis of rotation of the respective supported shaft. Accordingly, the further housing part, via which the indirect support takes place, is therefore radially arranged between the respective bearing and the bearing section integrally formed in one part in the region of the axial extent of the bearing.

For example, provision may be made that a flange section for connecting an electric motor is centered at an outer diameter in an opening of the bearing section, in which the drive shaft is arranged, and is precisely aligned with the bearing section by a suitable fit selection or tolerance selection. In this respect, the bearings of the drive shaft may be at least partly supported at the bearing section via this flange section, which is precisely aligned with the bearing section, such that the bearings supported directly at the flange section and indirectly at the bearing section may nevertheless be arranged exactly in alignment with one another or with further bearings of the drive shaft that are directly supported at the bearing section. Furthermore, due to a flange section that is precisely matched to the bearing section, a precise alignment of an electric motor, which may be connected to the flange section, with the drive shaft may be achieved such that, also due to the coupling of the drive shaft to an electric motor, no stress forces are transmitted to the drive shaft in the radial direction and an exact alignment of the drive shaft in parallel with the longitudinal direction of the vehicle may be ensured.

Provision may be made that an inner space of the housing defines a common oil chamber for the drive shaft and the driven shaft. Due to such a common oil chamber, a radiation surface for waste heat as large as possible may be provided, said waste heat being generated within the housing by the drive shaft, in particular on a connection to a fast-rotating electric motor. For this purpose, a speed reduction stage may furthermore in particular be provided between the drive shaft and the driven shaft such that the driven shaft rotates slowed down, and correspondingly with a smaller heat development, with respect to the drive shaft. Furthermore, a lubrication, in particular of the bearings of the shafts, may be achieved without a pump by such a common oil chamber in that the lubrication, for example, takes place via a gear drive and a wiper in a reservoir.

Furthermore, in some embodiments, the axle drive may be configured such that the common oil chamber communicates with an axle chamber which is in particular configured as the inner space of an axle housing or of an axle chamber housing section and into which the bevel gear at least projects. The oil chamber may consequently extend beyond the axle drive to be able to achieve a further improved leading off of waste heat. Furthermore, means for lubrication may thereby be arranged at or in the axle chamber without taking up additional installation space within the axle drive.

In some embodiments, the brake disk may be arranged outside the housing. In this respect, the brake disk may in particular be arranged completely outside the housing and thus also outside said oil chamber such that the brake may be designed as completely dry. For this purpose, the driven shaft may extend out of the housing with its second end such that the brake disk, which is rotationally fixedly connected to the driven shaft at the second end, may be arranged outside the housing. This may in particular also enable an assembly or dismantling of the brake disk, for example to replace a worn brake disk, without having to open the housing and having to access an inner space of the housing for this purpose. Furthermore, the configuration of the brake with a dry rotating brake disk makes it possible to achieve as high as possible an efficiency that is in particular increased with respect to a wet-running multi-disk brake.

Provision may be made that the housing extends around the brake disk such that it axially surrounds a peripheral region of the brake disk at both sides. In this respect, the housing may in particular have a flange section for connecting an electric motor, said flange section axially covering said peripheral region of the brake disk at least at one side, while the peripheral region may, for example, be covered by said bearing section at the axially opposite side. Due to such a nested design of the housing, a compact arrangement of the axle drive may be achieved by integrating a brake disk, which rotates outside the housing and thereby rotates dry, into the axle drive in as space-saving a manner as possible. In this respect, an anyway required flange section for connecting an electric motor may in particular be attached only slightly axially offset to be able to insert a peripheral section of a flat brake disk into the free space that is thereby produced in the axial direction with respect to the driven shaft and to be able to ideally use the space between the drive shaft and the driven shaft in the radial direction.

A reception recess for the brake disk may be formed at the housing, said reception recess having two side sections that face radially outwardly with respect to the drive shaft and that are axially connected to one another radially inside, wherein said peripheral region of the brake disk is arranged between the side sections. In this respect, the reception recess may in particular be formed by respective outer sides or outer surfaces of the housing such that the reception recess does not extend into an inner space of the housing and the brake disk thus also does not extend into such an inner space, but is arranged completely outside the housing despite the arrangement between the side sections of the reception recess.

The side sections formed by the housing may further be formed in a straight line, while it is also possible for at least one of the side sections to have a non-rectilinear structure and, for example, a stepped structure. With such a non-rectilinear side section, the spacing of the side section from the brake disk in the axial direction with respect to the driven shaft may consequently change along a radial direction with respect to the driven shaft. The reception recess may thus be approximately U-shaped, wherein the radially outwardly extending side sections do not necessarily form rectilinear limbs of such an approximately U-shaped reception recess. While the reception recess may be radially outwardly open in order, for example, to enable an insertion of the brake disk into the reception recess, the reception recess is closed radially inside by the axial connection of the side sections to one another.

The reception recess may be at least partly formed by a flange section of the housing provided for fastening the electric motor to the housing. Such a flange section may in particular form one of said side sections and be formed separately or separably from said bearing section integrally formed in one part. The side section not formed by the flange section may, for example, be formed by the bearing section. Due to the use of the flange section for forming one of the side sections of the reception recess, as compact as possible a design of the axle drive may be achieved in that the flange section that is anyway required for connecting the electric motor may also be used to nest the housing and to enable a space-saving arrangement of the brake disk.

In some embodiments, the brake may comprise a brake caliper that may be fastened to, in particular floatingly supported at, an outer side of the housing. In this respect, the fastening to an outer side of the housing may in particular enable a simple and fast assembly of the brake at the axle drive that may thereupon, for example as a complete unit for transmitting drive power to the vehicle axle, be connected to or installed into an axle housing.

The brake caliper of the brake and the reception recess of the housing may be arranged diametrically opposite one another with respect to the driven shaft. In this respect, the axle drive may be configured to be installed in the vehicle such that the brake caliper is arranged beneath the driven shaft and the reception section is arranged above the driven shaft. The brake caliper may in particular be arranged in a substantially straight line vertically beneath the reception section in the assembled state of the axle drive. The brake caliper or the brake may thereby also be easily accessible from below in the assembled state of the axle drive in order, for example, to service the brake or to replace components, in particular the brake disk, if necessary.

In some embodiments, the axle drive may be configured such that the brake disk may be removed without dismantling or opening the housing in that the brake caliper is first released from the housing and is then radially removed from the housing with respect to the driven shaft and the brake disk is released from the second end of the driven shaft and is then radially removed from the reception recess with respect to the driven shaft. In such embodiments, the brake disk may, for example, be removed to replace a worn brake disk without closures or flange sections of the housing having to be released or the housing having to be removed from an axle housing to which the axle drive may be connected in the assembled state.

The brake caliper may in this respect be fastened to an outer side of the housing. The brake caliper may in particular be arranged vertically downwardly disposed in the assembled state of the axle drive such that the brake caliper may be accessible in a simple manner and may be radially removed from the housing with respect to the driven shaft. In this respect, the brake caliper may in particular be arranged perpendicular below the driven shaft. Alternatively thereto, the brake caliper may, however, also be attached laterally and rotated by up to 90°, preferably by up to 45°, in comparison with an arrangement that is perpendicular with respect to the driven shaft. Here, too, the brake caliper may engage around a radially outwardly disposed section of the brake disk and may be easily accessible from the outside to be able to be removed in the radial direction with respect to the driven shaft. Whereas, in the assembled state, the brake caliper may so-to-say radially outwardly block the reception recess with respect to the drive shaft or with respect to the driven shaft, the brake disk may be accessible after such a simple removal of the brake caliper and, possibly after a slight axial offset within the reception recess, the brake disk may without problem be radially removed from the reception recess with respect to the drive shaft or vertically downwardly removed from the reception recess. In the same way, a brake disk that has, for example, been replaced may then first be connected to the driven shaft again, whereupon the brake caliper may also be fastened to the housing again.

In some embodiments, provision may further be made that the spacing of the side sections of the reception recess is dimensioned such that the brake disk may be completely removed from the driven shaft or a holder of the driven shaft in an axial direction with respect to the driven shaft. Such a spacing of the side sections may consequently make it possible, for example, to remove fastening means by which the brake disk is fastened to a holder of the driven shaft or to the driven shaft itself for a rotationally fixed connection to the driven shaft to be able to release the brake disk from the driven shaft or its holder in the axial direction and thereupon to be able to freely remove the brake disk from the reception recess in the radial direction. This may in particular enable a simple and fast assembly and dismantling of the brake disk when the axle drive is completely installed and is, for example, connected to an axle housing of a vehicle.

In some embodiments, the output section of the drive shaft and the input section of the driven shaft are coupled drive-wise to one another via at least one spur gear set. In this respect, the spur gear set may in particular be arranged within a housing of the axle drive. Such a spur gear set may enable as compact and direct a transmission as possible of the drive power from the drive shaft to the driven shaft, wherein a reduction or a slowing down of the rotational speed from the drive shaft to the driven shaft may in particular take place by a suitable selection of the gear wheels of the spur gear set.

Provision may be made that the drive shaft and the driven shaft are rotationally fixedly connected to a respective gear wheel of the spur gear set, wherein the housing may have an assembly opening through which the driven shaft may be introduced into the housing in axial direction, and wherein the housing may have an insertion opening through which the gear wheel of the driven shaft may be inserted into the housing from radial direction with respect to the driven shaft. The gear wheels may in this respect be configured as separate components. In general, however, at least one of the gear wheels, in particular the gear wheel connected to the drive shaft, may also be integrally formed at the drive shaft or the driven shaft.

Since only the driven shaft, which is formed with a relatively smaller extent in the radial direction, is to be inserted through the assembly opening, the assembly opening may, for an axial insertion of the driven shaft, be formed with as small a diameter as possible and at most a slightly larger diameter than the diameter of the driven shaft to be able to arrange and support the driven shaft as precisely as possible in the inner space of the housing and in particular in a bearing section integrally formed in one part. In contrast, the gear wheel of the driven shaft having a relatively larger radial extent may be introduced from the radial direction, in particular before the introduction of the driven shaft, through the insertion opening into an inner space of the housing. The driven shaft may thereupon, for example, be guided from the axial direction through an opening in a central section of the gear wheel and may be rotationally fixedly connected to the gear wheel within the housing, for example, by shrinking or thermal expansion. Provision may also be made to rotationally fixedly couple the gear wheel to the driven shaft by means of a form fit and/or friction locking, for which purpose the gear wheel may in particular be connected to the driven shaft via a splined shaft connection. The insertion opening may in particular be arranged vertically downwardly disposed in a fully assembled state of the axle drive.

In this respect, the introduction of the gear wheel from the radial direction through the insertion opening in particular makes it possible to insert a gear wheel having a relatively large diameter into the inner space of the housing without having to form an opening having a similarly large radial extent for this purpose to be able to insert the gear wheel from the axial direction. Rather, the insertion opening may, for example, be formed as a shallow slit and the assembly opening may be formed with a small diameter such that a simple assembly may be achieved by these openings without weakening the housing in a relevant manner. Furthermore, gear wheels having relatively large diameters may also be introduced through such an insertion opening to be able to form the spur gear set as a speed reduction stage and to enable a reduction or a slowing down of the rotational speed from the drive shaft to the driven shaft.

The housing may further have a fastening recess, wherein the insertion opening is formed in a base of the fastening recess, said base being radially inwardly offset relative to an outer border of the fastening recess with respect to the driven shaft. A cover may further be provided to close the insertion opening, said cover being attachable to the insertion opening and consequently to the base of the fastening recess. In this respect, the cover may in particular be configured such that, when it closes the insertion opening, it is arranged radially inwardly offset relative to the border of the insertion opening. In this respect, the cover preferably does not extend radially outwardly beyond the border of the fastening recess. The cover may thus be arranged radially inwardly protected by the further parts of the housing, in particular a bearing section, and may accordingly not be arranged in an exposed manner such that the cover may be protected from external influences and possible damage during travel, which is in particular important for a downwardly disposed orientation of the insertion opening in the assembled state.

Consequently, such a radially inwardly offset cover enables a very compact design and simple assembly of an axle drive comprising two shafts that are aligned in parallel with one another and that are connected to one another via a spur gear set without the openings required for the assembly resulting in a weakening of the housing.

In this regard, the invention also relates independently of an axle drive comprising a brake, in particular having a parking brake, to an axle drive for a vehicle comprising at least one drivable vehicle axle oriented transversely to a longitudinal direction of the vehicle, said axle drive comprising a drive shaft that extends in parallel with the longitudinal direction and that is configured to receive drive power from a motor, in particular an electric motor, at an input section and to output said drive power at an output section; and a driven shaft that extends offset from the drive shaft in parallel with the longitudinal direction of the vehicle between a first end and a second end opposite thereto and that is configured to receive drive power from the output section of the drive shaft at an input section and to output said drive power to the vehicle axle via a bevel gear arranged at the first end, wherein the drive shaft and the driven shaft are coupled drive-wise to one another via a spur gear set, wherein the axle drive has a housing having an assembly opening through which the driven shaft may be axially introduced into an inner space of the housing, and wherein the housing has an insertion opening through which a gear wheel of the spur gear set rotationally fixedly connectable to the driven shaft may be radially introduced into the inner space of the housing with respect to the driven shaft, wherein the insertion opening is formed in a base of a fastening recess of the housing, said base being radially inwardly offset relative to an outer border of the fastening recess with respect to the driven shaft, and wherein the housing has a cover for the insertion opening, said cover being arranged radially inwardly offset relative to the border of the insertion opening with respect to the driven shaft when the cover closes the insertion opening.

Embodiments of the axle drive disclosed here comprising a brake are also possible for an axle drive that is generally independent thereof and that has a radially inwardly arranged cover for closing an insertion opening.

In some embodiments, generally with respect to the disclosed axle drive comprising a brake, the output section of the drive shaft and the input section of the driven shaft may be coupled drive-wise to one another such that a speed reduction results on the transmission of the drive power from the drive shaft to the driven shaft. A rotation of the drive shaft may consequently be transmitted slowed down to the driven shaft in order in particular also to be able to use fast-rotating electric motors. Due to such a speed reduction, the torque required to drive the vehicle axle may be applied, on the one hand, while, on the other hand, due to the brake disk that equally rotates at a reduced rotational speed, vibrations of the brake disk and an associated noise formation may be minimized or avoided.

The axle drive may be configured to be installed in the vehicle such that the drive shaft is arranged vertically offset from the driven shaft. In this respect, the axle drive may in particular first be completely pre-assembled or assembled and may then be installed as a unit into an axle housing or fastened to an axle housing. In this respect, the drive shaft may in particular extend vertically above the driven shaft to enable access from below to the brake disk arranged at the driven shaft.

In some embodiments, the axle drive may further comprise a ring gear that meshes with the bevel gear. Due to such a ring gear, a deflection of the rotation of the bevel gear about the driven shaft aligned in parallel with the longitudinal direction of the vehicle into a rotation about the vehicle axle oriented transversely to this longitudinal direction may in particular be achieved to be able to drive the vehicle axle.

In this respect, the axle drive may further comprise at least one half-shaft of the vehicle axle, wherein the ring gear may be rotationally fixedly coupled to the half-shaft. Due to such a coupling, the rotation transmitted from the bevel gear to the ring gear may thus be directly conducted to the vehicle axle. In this respect, provision may generally be made that two half-shafts of the vehicle axle are rotationally fixedly connected to the ring gear such that wheels arranged at respective ends of the half-shafts may be uniformly driven by means of the axle drive. Alternatively thereto, provision may be made that the axle drive drives only one of the half-shafts and a further axle drive having a further electric motor is provided for driving the other half-shaft such that, by a suitable control of the electric motors, different rotational speeds of wheels arranged at the ends of the half-shafts may in each case be generated in order, for example, to facilitate the driving through of a bend. In this respect, said half-shafts may in particular be formed in multiple parts or at least in two parts, wherein a first part may be directly connected to the ring gear, while a second part of the half-shaft may, for example, be rotationally fixedly connected to the first part via a flange. The first part may in this respect further extend within a housing section of a housing of the axle drive. Alternatively thereto, the axle drive may further comprise a differential for distributing at least a respective portion of the drive power to two half-shafts of the vehicle axle, wherein the ring gear may be rotationally fixedly coupled to the differential. Driven shafts of the differential may in this respect be rotationally fixedly connected to a respective half-shaft of the vehicle axle, for example via a flange, or may correspond to the half-shafts. Furthermore, the differential may be arranged in a housing section that is included by a housing of the axle drive or that may be connected to such a housing. Due to such a differential, a proportional distribution of the drive power to the half-shafts and to wheels associated therewith may, for example, take place to enable a faster rotation of an outwardly disposed wheel during the driving through of a bend.

The invention will be explained purely by way of example in the following with reference to embodiments and to the drawing.

Figure 2A:
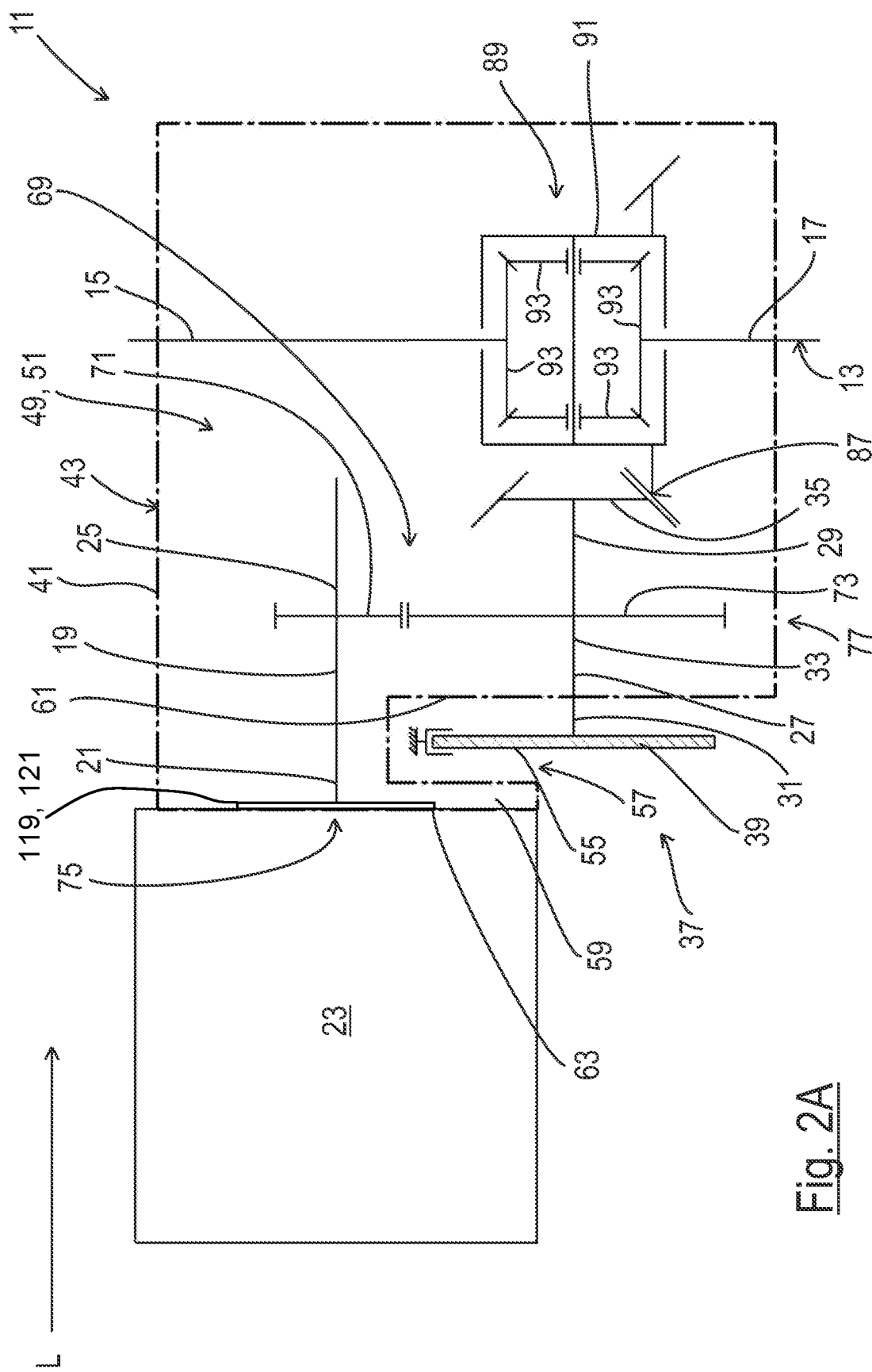
Figure 2B:
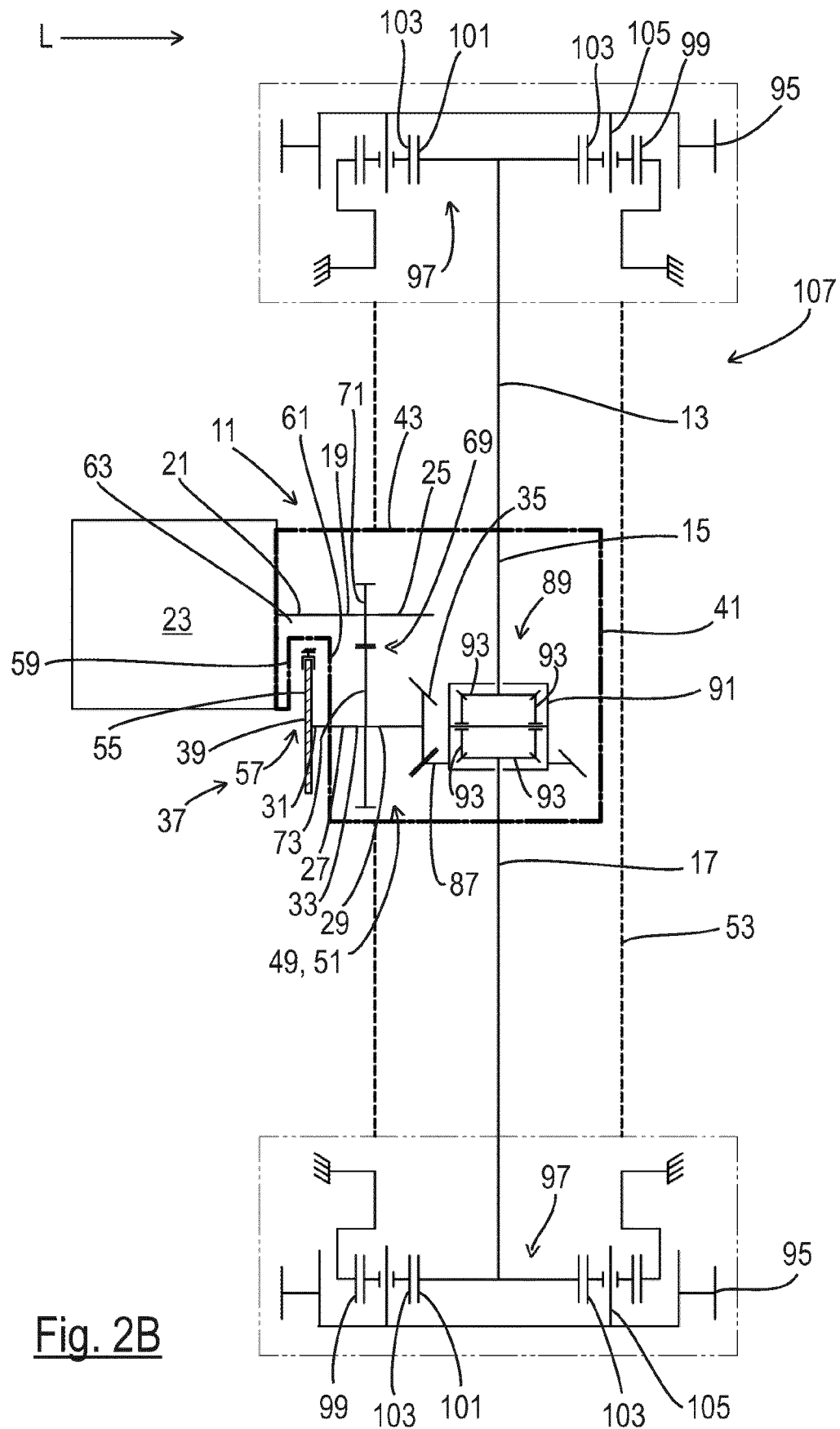
Figure 3A:
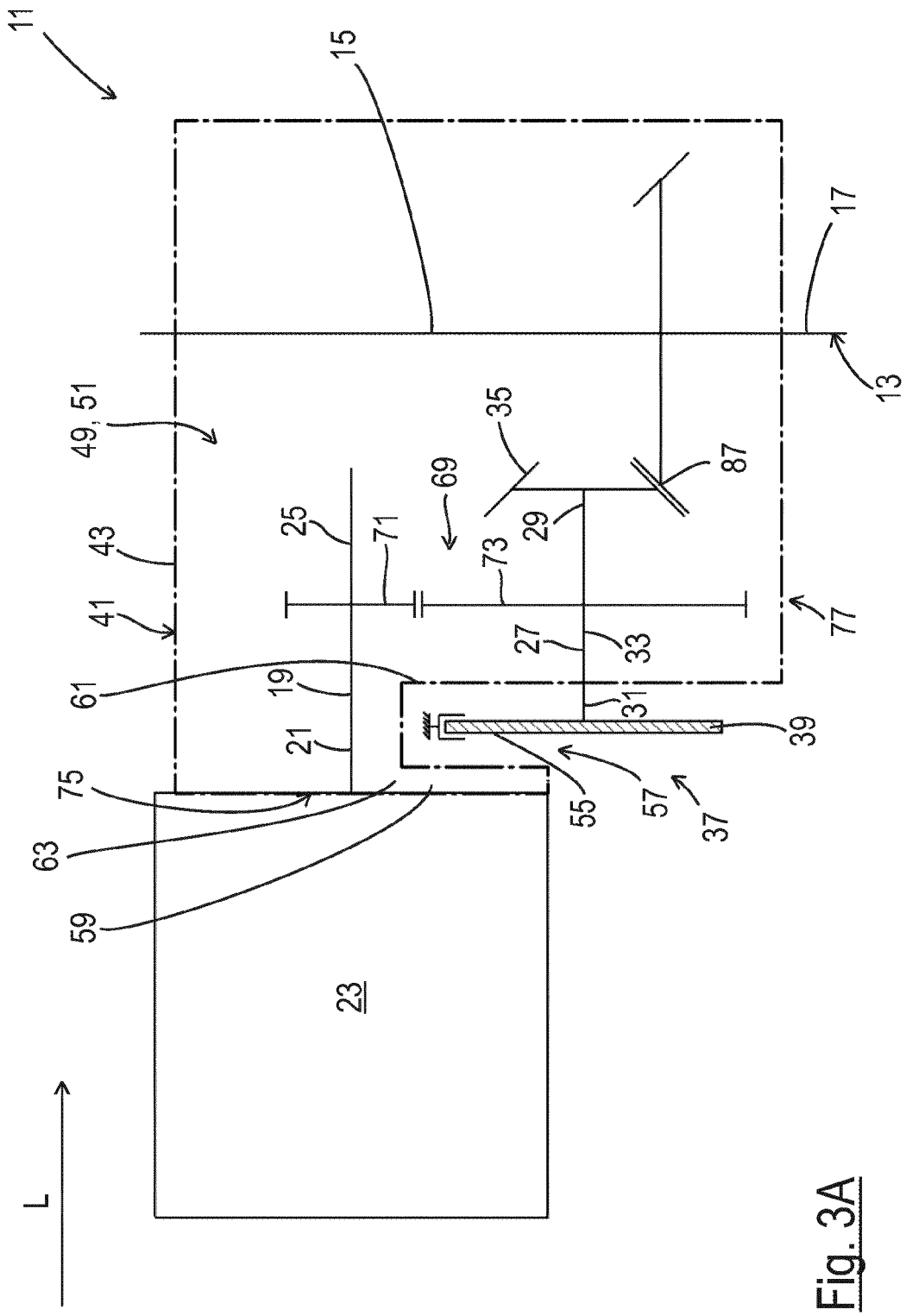
Figure 3B:
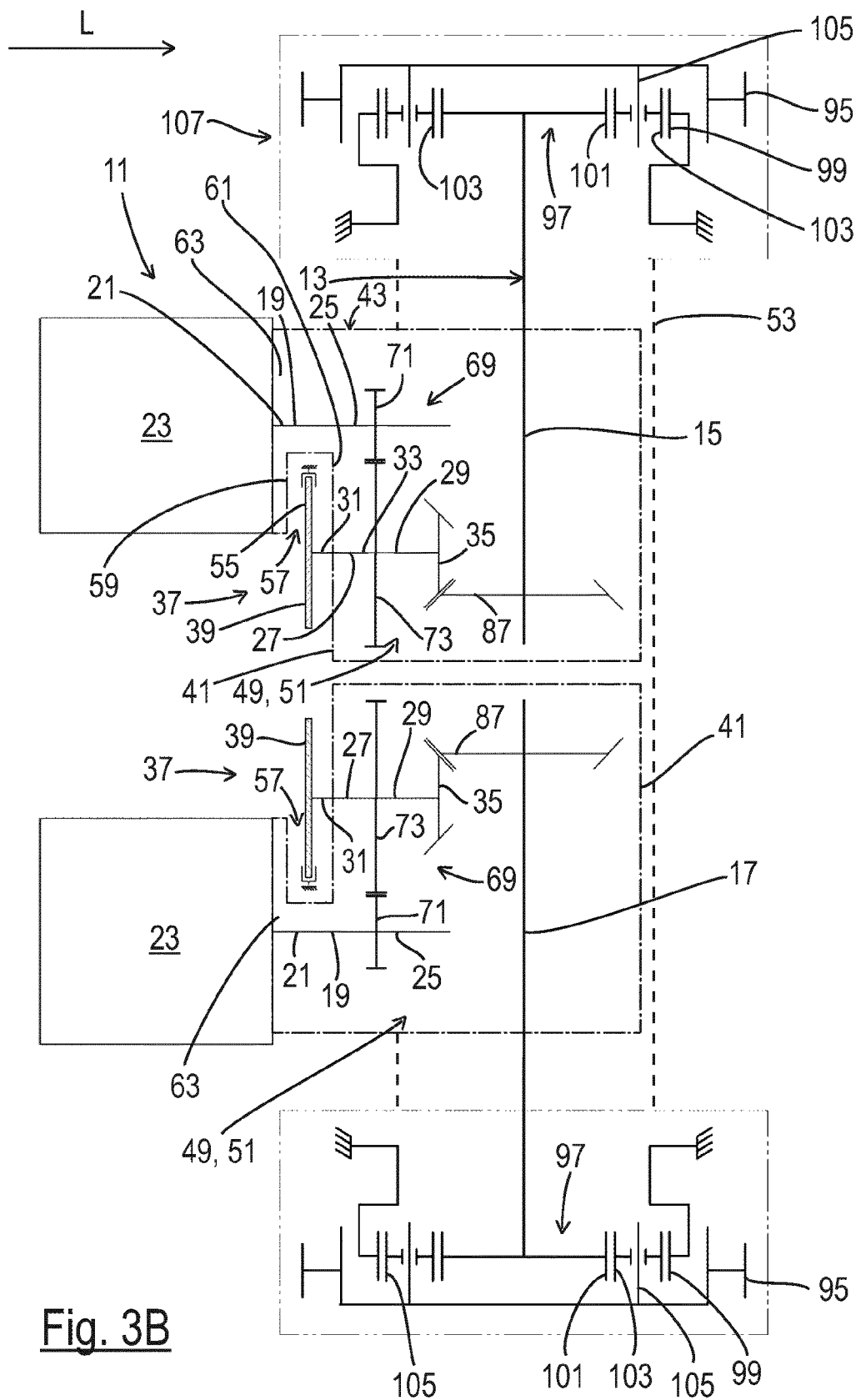

There are shown:

FIG. 1 a representation of an axle drive with a brake;

FIGS. 2A and 2B a schematic representation of an embodiment of the axle drive and a schematic representation of such an axle drive in connection with a vehicle axle driven by the axle drive; and FIGS. 3A and 3B a schematic representation of a further embodiment of the axle drive and a schematic representation of two such axle drives, in each case in connection with a respective half-shaft of a vehicle axle individually driven by the respective axle drive.

The Figures each show an axle drive 11 for driving a vehicle axle 13 oriented transversely to a longitudinal direction L of a vehicle, not shown. This axle drive 11 in this respect has a drive shaft 19 that is aligned in parallel with the longitudinal direction L and that is coupled via a spur gear set 69 to a driven shaft 27 that likewise extends in parallel with the longitudinal direction L and offset from the drive shaft 19 (cf. FIG. 1 and the schematic representations in particular of FIGS. 2A and 3A).

The drive shaft 19 comprises an input section 21 that forms an end section 119 of the drive shaft 19 and that is configured to receive drive power from an electric motor 23 (cf. in particular FIGS. 2A and 3A). In the embodiment of FIG. 2A, the input section 21 in particular is the end section 119 of the drive shaft 19 and the end section 119 is formed by a flange 121 for connecting the drive shaft 19 to the electric motor 23, in particular its motor shaft. The electric motor 23 (having a stator and a rotor) is oriented coaxially to the drive shaft 19. The drive shaft 19 further has an output section 25 at which a gear wheel 71 is arranged that is rotationally fixedly connected to the drive shaft 19, that meshes with a gear wheel 73 arranged at an input section 33 of the driven shaft 27, and that, together with said gear wheel 73, forms said spur gear set 69 for transmitting drive power from the drive shaft 19 to the driven shaft 27.

A bevel gear 35 that meshes with a ring gear 87 is further arranged at a first end 29 of the driven shaft 27 to transmit drive power to the vehicle axle 13 and to deflect it in so doing. As can be seen from FIGS. 2A and 2B or 3A and 3B and as explained in more detail below, the ring gear 87 may in this respect be rotationally fixedly connected to a half-shaft 15 or 17 of the vehicle axle 13 in order to transmit the drive power directly to a wheel arranged at the respective half-shaft 15 or 17, or the ring gear 87 may be rotationally fixedly coupled to a differential cage 91 of a differential 89 by means of which the drive power transmitted to the ring gear 87 may be proportionally distributed to the two half-shafts 15 and 17.

The drive shaft 19 and the driven shaft 27 are, at least partly, arranged within a housing 41, wherein in particular the output section 25 of the drive shaft 19 and the input section 33 of the driven shaft 27 and accordingly also the spur gear set 69 are arranged in an inner space 49 of the housing 41 (cf. FIG. 1). In this respect, the housing 41 has a bearing section 43 which is integrally formed in one part, which is manufactured as a single bonded component, and at which bearings 45, 46, and 47 for the drive shaft 19 or the driven shaft 27 are supported. Due to this support of the bearings 45, 46, and 47 at the bearing section 43 integrally formed in one part, the respective bearings 45 and 46 of the drive shaft 19 or the bearings 47 of the driven shaft 27 may be oriented exactly in alignment with one another to be able to handle the high rotational speeds, in particular of the drive shaft 19, generated by a fast-rotating electric motor 23 and to be able to use such compact electric motors 23.

While the bearings 47 of the driven shaft 27 and the bearing 46 of the drive shaft 19 are supported directly at the bearing section 43, the bearing 45 of the drive shaft 19 arranged in the region of the input section 21 is directly supported at a flange section 63 and is indirectly supported at the bearing section 43 via the flange section 63. This flange section 63 in particular serves to connect an electric motor 23 (cf. FIGS. 2A to 3B) and may be centered at an outer diameter in the bearing section 43. In this respect, the flange section 63 is inserted into an opening of the bearing section 43 such that it is radially arranged between the bearing 45 and the bearing section 43 with respect to the drive shaft 19 and in this respect radially directly adjoins the bearing 45, on the one hand, and the bearing section 43, on the other hand. The flange section 63 and the bearing section 43 may further be precisely aligned with one another by a suitable fit selection or tolerance selection, wherein the flange section 63 may be fastened to the bearing section 43 by means of a plurality of fastening means 113, in particular screws. Despite the merely indirect support of the bearing 45 at the bearing section 43, the bearings 45 and 46 may thereby be positioned exactly in alignment with one another to ensure a precise alignment of the drive shaft 19 in parallel with the longitudinal direction L of the vehicle. Furthermore, due the precise alignment and centering of the flange section 63 in the bearing section 43, an exact alignment of the electric motor 23 via the flange section 63 for connection to the input section 21 of the drive shaft 19 may be ensured.

The gear wheels 71 and 73 of the drive shaft 19 or the driven shaft 27 are here configured such that a reduction or a slowing down of the rotational speed of the drive shaft 19 takes place at the spur gear set 29 and the driven shaft 27 rotates slowed down with respect to the drive shaft 19. In particular on the use of fast-rotating electric motors 23 for transmitting drive power to the input section 21 of the drive shaft 19, the necessary torques for driving the vehicle axle 13 may be achieved by such a speed reduction stage.

Furthermore, the inner space 49 of the housing 41 forms a common oil chamber 51 such that the bearings 45, 46, and 47 may be lubricated without a pump, on the one hand, and a larger surface for leading off waste heat generated by the fast-rotating drive shaft 19 may be provided, on the other hand. Waste heat generated by the drive shaft 19 may thus also be led off in a region of the driven shaft 27 that generates a smaller amount of waste heat due to its slowed-down rotation. This common oil chamber 51 may in particular further communicate with an axle chamber 117, into which the bevel gear 35 projects, via the first end 29 of the driven shaft 27 at which the bevel gear 35 is arranged. This may enable a further increase in the radiation surface for leading off waste heat and a lubrication of the axle drive 11 via a gear drive and a wiper in a reservoir without a pump being necessary. In this respect, the axle chamber 117 may in particular be surrounded by an axle chamber housing section 115 that is connected to the bearing section 43 by means of respective fastening means 113. This axle housing section 115 may thus be part of the housing 41 of the axle drive 11 such that the total axle drive 11 or its housing 41 may be pre-assembled and connected as a complete unit to an axle housing 53 of the vehicle axle 13 (cf. also FIGS. 2B and 3B).

As FIG. 1 further shows, the housing 41 has an assembly opening 75 which is formed at the bearing section 43 and through which the driven shaft 27 may be inserted into the inner space of the housing 41 from the axial direction. In order also to be able to insert the gear wheel 73, which is formed with a relatively large diameter, into the inner space of the housing 41 and to be able to connect it to the driven shaft 27, the housing 41 has an insertion opening 77 at a lower side in the assembled state of the axle drive 11, through which insertion opening 77 the gear wheel 73 may be radially inserted into the inner space 49 of the housing 41 with respect to the driven shaft 27. This makes it possible, during an assembly of the axle drive 11, to first insert the gear wheel 73 from the radial direction through the insertion opening 77 into the inner space 49 and then to insert the driven shaft 27 with an exact fit from the axial direction through the assembly opening 75 into the inner space 49 and to precisely arrange said driven shaft 27 between the bearings 47. The driven shaft 27 may then be rotationally fixedly connected to the gear wheel 73, for example, by shrinking or thermal expansion. A form-fitting and/or friction-locked connection, in particular via a splined shaft connection, may also be provided. The bevel gear 35 may in particular already be connected to the driven shaft 27 or formed in one part with the driven shaft 27 before the insertion of the driven shaft 27 into the inner space of the housing 41.

To be able to close the insertion opening 77 after the insertion of the gear wheel 73, the housing 41 has a cover 79 that is fastened to a base 85 of a fastening recess 81 by means of a plurality of fastening means 113. Due to the attachment of the cover 79 in the fastening recess 81, the cover 79 is radially inwardly offset relative to an outer border 83 of the fastening recess 81 with respect to the driven shaft 27 and in this respect does not project radially outwardly beyond the border 83. In this way, the cover 79 is protected from external influences and damage, in particular during a trip with the vehicle. The assembly opening 75 and the insertion opening 77, which may be closed by the cover 79, thus enable a simple and convenient assembly of the axle drive 11, wherein a very compact design of the axle drive 11 may be achieved by the two-sided insertion of the driven shaft 27 and the gear wheel 73. Due to the radially inward offset of the cover 79, a possible weakening of the housing 41 by the insertion opening 77 arranged at the lower side of the housing 41 or by a cover 79 positioned elsewhere and in an exposed manner may be reliably prevented.

While the common oil chamber 51 already mentioned communicates with the axle chamber 117 through the first end 29 of the driven shaft 27, which exits the housing 41, and the bevel gear 35 arranged thereat, the driven shaft 27 projects out of the housing 41 with a second end 31 opposite the first end 29 in a manner sealed by seals 111. At this second end 31, a brake disk 39 of a brake 37 is rotationally fixedly connected to the driven shaft 27 via a holder 67. Due to the seal 111, the brake disk 39 in this respect runs completely dry such that the brake 37 is designed as a dry brake. The brake disk 39 is further arranged between the input section 21 of the drive shaft 19 and the input section 33 of the driven shaft 27 (and thus axially between the electric motor 23 and the spur gear 69) with respect to the longitudinal direction L such that the axle drive 11 does not experience any relevant extension along the longitudinal direction L due to the configuration with the brake disk 39. As can be seen from the Figures, a section of the drive shaft 19 extends radially offset from the brake disk 69.

The brake 37 further has a brake caliper 65 that is fastened in a floatingly supported manner to an outer side of the housing 41 by being screwed to the housing 41 in parallel with the longitudinal direction L. In this respect, the brake caliper 65 is in particular arranged at a lower side of the housing 41 in an assembled state of the axle drive 11 such that, after a loosening of the screw connection, the brake caliper 65 may be removed in a simple manner in the radial direction with respect to the driven shaft 27 in order to enable access to the brake disk 39.

The brake 37 in this respect acts as a parking brake and is provided to reliably secure the vehicle against rolling away when stationary by an engagement of the brake caliper 65 into the brake disk 39. In addition, the brake 37 also serves to provide an emergency braking function. For this purpose, the brake caliper 65 may be actively brought out of engagement with the brake disk 39 during the travel, wherein it is configured to automatically come into engagement with the brake disk 39 and to brake the vehicle on a failure or a disturbance of the pressure required for this purpose.

While the brake disk 39 is arranged completely outside the housing 41 or its inner space 49, the housing 41 forms a reception recess 57 that is bounded in the axial direction by two side sections 59 and 61 and that surrounds a peripheral region 55 of the brake disk 39 that is dependent on the respective rotational position of the brake disk 39. These side sections 59 and 61 extend radially outwardly and are axially connected to one another radially inside with respect to the drive shaft 19. In this respect, the side section 59 is formed by the flange section 63 connected to the bearing section 43, whereas the side section 61 is formed by the bearing section 43 itself. The side section 59 extends outwardly substantially in a straight line in the radial direction with respect to the drive shaft 19, while the side section 61 has a structure and the spacing in the axial direction between the side section 61 and the brake disk 39 changes in the radial direction. Accordingly, the reception recess 57 is substantially U-shaped, wherein the side sections 59 and 61 do not necessarily form rectilinear limbs of this U-shaped reception recess 57.

Due to the reception recess 57, a high integration of the brake 37 or of its brake disk 39 in the axle drive may be achieved. The nested design of the housing 41 makes it possible to arrange the peripheral region 55 of the brake disk 39 in a section of the axle drive 11 that, due to the spur gear set 69 and the flange section 63, anyway requires a certain extent of the axle drive 11 in the radial direction with respect to the drive shaft 19 or the driven shaft 27. Since the extent of the peripheral section 55, which is surrounded by the side sections 59 and 61, at least approximately corresponds to the radius of the brake disk 39 in the radial direction, the configuration of the axle drive 11 with the brake 37 or the brake disk 39 only requires a minimal additional extent of the axle drive 11 of at most approximately one radius of the brake disk 39 in the radial direction. In the present case, this radial installation space is, in contrast, also already occupied by the gear wheel 73 of the driven shaft 27 such that the configuration of the axle drive 11 with the brake disk 39 substantially does not result in an additional extension of the axle drive 11 in the radial direction. The axle drive 11 may thereby in particular be equipped with a parking brake function and/or an emergency brake function in a very space-saving manner.

In the longitudinal direction L, the flange section 63 required for connecting the electric motor 23 is arranged only slightly axially offset to provide a free space or the reception recess 57 for the brake disk 39. The configuration of the axle drive 11 with a brake disk 39 thus also requires only a very small additional extension of the axle drive 11 in the longitudinal direction L such that this nested design of the axle drive 11 or of its housing 41 may enable an axle drive 11 of compact design as desired.

Furthermore, the spacing of the side sections 59 and 61 in the axial direction may be dimensioned such that the brake disk 39 may be completely released from the holder 67 in the axial direction. In order, for example, to be able to replace the brake disk 39, the brake caliper 65 may consequently first be released from the housing 41 and removed in the radial direction. Thereupon, the fastening means 113 by which the brake disk 39 is fastened to the holder 67 may also be released and removed, whereupon the brake disk 39 may be removed from the holder 67 or the driven shaft 27 in the axial direction and may be removed from the reception recess 57 in the radial direction. The axle drive 11 is consequently configured such that the brake disk 39 may be removed without dismantling or opening the housing 41 or without removing individual housing parts.

Furthermore, due to the reduction of the rotational speed from the drive shaft 19 to the driven shaft 27 taking place at the spur gear set 69, the brake disk 39 also rotates at a reduced rotational speed with respect to the drive element 19 during a journey of the vehicle. Due to this reduced rotational speed, strong vibrations of the brake disk 39 may in particular be prevented from forming such that a noise formation or possible instabilities of the axle drive 11 may be avoided on the use of fast-rotating electric motors 23 for driving the drive shaft 19.

FIGS. 2A and 2B schematically show an embodiment of the axle drive and its connection to an axle housing 53. In this respect, an electric motor 23 is connected to the flange section 63, said electric motor 23 outputting drive power to the input section 21 of the drive shaft 19 that transmits the drive power at the output section 25 to the input section 33 of the driven shaft 27. The drive shaft 19 and the driven shaft 27 are in this respect connected to one another via the spur gear set 69, wherein a reduction of the rotational speed from the drive shaft 19 to the driven shaft 27 takes place by the gear wheels 71 and 73. The brake disk 39 is arranged at the second end of the driven shaft 27, said brake disk 39 being received outside the housing 41 of the axle drive 11 in the reception recess 57 formed by the housing 41 and being part of the brake 37. The bevel gear 35, which meshes with the ring gear 87, is arranged at the first end 29 of the driven shaft 27 opposite the second end 31.

In this embodiment, the ring gear 87 is rotationally fixedly connected to a differential cage 91 of a differential 89 whose driven shafts are rotationally fixedly connected to a respective half-shaft 15 or 17 of a vehicle axle 13. The balancing gears 93 of the differential 89 in this respect make it possible to proportionally transmit drive power received via the bevel gear 35 and the ring gear 87 to the half-shafts 15 and 17.

As FIG. 2B shows, the housing 41 of the axle drive 11 may be connected to the axle housing 53, wherein the axle drive 11 may in particular first be pre-assembled and may thereupon be inserted as a complete unit into the axle housing 53. The vehicle axle 13 is in this respect configured as an outer planetary axle 107 and, at the ends of the half-shafts 15 and 17, has respective planetary gear sets 97 by means of which the rotational speed of the half-shafts 15 and 17 is transmitted in a speed-reduced or slowed-down manner to a respective wheel hub 95 for driving a wheel.

The reduction in speed in this respect takes place in that the half-shafts 15 and 17 are rotationally fixedly connected to a respective sun gear 101 that is surrounded by a plurality of planet gears 103. A ring gear 99 arranged concentrically to and surrounding the sun gear 101 is rotationally fixedly held, while the planet gears 103 rotate about axles that are supported on a web 105 revolving around the sun gear 101. In this respect, the web 105 is rotationally fixedly connected to the wheel hub 95 such that the latter rotates at the rotational speed of the web 105 that is reduced in comparison with the sun gear 101 or with a respective one of the half-shafts 13 and 15. In particular on the use of fast-rotating electric motors 23, such outer planetary axles 107 may also be provided to further reduce the rotational speed and to increase the torque.

In the embodiment shown in FIGS. 3A and 3B, instead of the differential 89, only a ring gear 87 is provided that meshes with a bevel gear 35 arranged at a second end of a driven shaft 27 and that is rotationally fixedly connected to at least one half-shaft 15 or 17. As FIG. 3A shows, the ring gear 87 may in this respect be rotationally fixedly connected to both half-shafts 15 and 17 in order to directly drive the total vehicle axle 13.

Alternatively thereto, as illustrated in FIG. 3B, it is also possible to provide a respective separate axle drive 11, having a separate electric motor 23, for each half-shaft 15, 17 for driving the half-shafts 15 and 17. In this respect, each of the half-shafts 15 and 17 is rotationally fixedly connected to a ring gear 87 such that the electric motors 23 may drive the half-shafts 15 and 17 individually or independently from one another. A drive power may thereby also be proportionally transmitted to the two half-shafts 15 and 17 depending on the situation in order, for example, to enable a faster rotation of a wheel rotating at the outside on the driving through of a bend. The vehicle axle 13 is again provided as an outer planetary axle 107 having respective planetary gear sets 97, which act as reduction gear units, for transmitting the rotation to the wheels. In general, the axle drive 11 disclosed herein may, however, be provided for driving vehicle axles 13 of any kind.

The axle drive 11 disclosed herein consequently enables a very compact design with a high integration of a brake 37, in particular a parking brake, and its brake disk 39 into the axle drive 11. Furthermore, the slowing down of the rotational speed from the drive shaft 19 to the driven shaft 27 and to the brake disk 39 rotationally fixedly connected thereto enables the use of fast-rotating and compact electric motors 23 without the fast rotations resulting in strong vibrations of the brake disk 39 that may possibly damage the axle drive 11 and result in a strong noise formation. The configuration of the axle drive 11 with a housing 41, which has a bearing section 43 integrally formed in one part, may furthermore enable an exact alignment of the bearings 45, 46, and 47 of the drive shaft 19 and of the driven shaft 27 to be able to handle the high rotational speeds of a fast-rotating electric motor 23.

REFERENCE NUMERAL LIST 11 axle drive
13 vehicle axle
15 first half-shaft
17 second half-shaft
19 drive shaft
21 input section of the drive shaft
23 electric motor
25 output section of the drive shaft
27 driven shaft
29 first end
31 second end
33 input section of the driven shaft
35 bevel gear
37 brake
39 brake disk
41 housing
43 bearing section
45 drive-side bearing of the drive shaft
46 driven-side bearing of the drive shaft
47 bearing of the driven shaft
49 inner space of the housing
51 common oil chamber
53 axle housing
55 peripheral region of the brake disk
57 reception recess
59 side section
61 side section
63 flange section
65 brake caliper
67 holder
69 spur gear set
71 gear wheel of the drive shaft
73 gear wheel of the driven shaft
75 assembly opening
77 insertion opening
79 cover
81 fastening recess
83 outer border of the fastening recess
85 base of the fastening recess
87 ring gear
89 differential
91 differential cage
93 balancing gear
95 wheel hub
97 planetary gear set
99 ring gear
101 sun gear
103 planet gear
105 web
107 outer planetary axle
111 seal
113 fastening means
115 axle chamber housing section
117 axle chamber
119 end section
121 flange
L longitudinal direction of the vehicle

What is claimed is:

1. An axle drive for a vehicle comprising at least one drivable vehicle axle oriented transversely to a longitudinal direction of the vehicle, said axle drive comprising
    a drive shaft that extends in parallel with the longitudinal direction of the vehicle and that is configured to receive drive power from an electric motor at an input section and to output said drive power at an output section;
    a driven shaft that extends offset from the drive shaft and in parallel with the longitudinal direction of the vehicle between a first end and a second end opposite thereto and that is configured to receive drive power from the output section of the drive shaft at an input section and to output said drive power to the vehicle axle via a bevel gear arranged at the first end; and
    a brake having a brake disk that is arranged at the second end of the driven shaft and that is arranged between the input section of the drive shaft and the input section of the driven shaft with respect to the longitudinal direction of the vehicle;
    wherein a diameter of the brake disk is at least as large as the offset between the drive shaft and the driven shaft.

2. The axle drive in accordance with claim 1,
    wherein the axle drive further comprises a housing in which the drive shaft and the driven shaft are received, wherein the output section of the drive shaft and the input section of the driven shaft are arranged within the housing.

3. The axle drive in accordance with claim 2,
    wherein the housing has a bearing section integrally formed in one part, wherein bearings for supporting at least one of the drive shaft and/or the driven shaft are supported at the bearing section.

4. The axle drive in accordance with claim 2,
    wherein an inner space of the housing defines a common oil chamber for the drive shaft and the driven shaft.

5. The axle drive in accordance with claim 4,
    wherein the axle drive is configured such that the common oil chamber communicates with an axle chamber into which the bevel gear projects.

6. The axle drive in accordance with claim 2,
    wherein the brake disk is arranged outside the housing.

7. The axle drive in accordance with claim 6,
    wherein the housing extends around the brake disk such that it axially surrounds a peripheral region of the brake disk at both sides.

8. The axle drive in accordance with claim 7,
    wherein a reception recess for the brake disk is formed at the housing, said reception recess having two side sections that face radially outwardly with respect to the drive shaft and that are axially connected to one another radially inside, wherein said peripheral region of the brake disk is arranged between the side sections.

9. The axle drive in accordance with claim 8,
wherein the reception recess is at least partly formed by a flange section of the housing, said flange section being provided for fastening the electric motor to the housing.

10. The axle drive in accordance with claim 8,
wherein the spacing of the side sections of the reception recess is dimensioned such that the brake disk can be completely removed from the driven shaft or a holder of the driven shaft in an axial direction with respect to the driven shaft.

11. The axle drive in accordance with claim 2,
wherein the brake comprises a brake caliper that is fastened to, an outer side of the housing.

12. The axle drive in accordance with claim 1,
wherein the output section of the drive shaft and the input section of the driven shaft are coupled drive-wise to one another via at least one spur gear set.

13. The axle drive in accordance with claim 12,
wherein the drive shaft and the driven shaft are rotationally fixedly connected to a respective gear wheel of the spur gear set, wherein the housing has an assembly opening through which the driven shaft can be introduced into the housing in an axial direction, and wherein the housing has an insertion opening through which the gear wheel of the driven shaft can be inserted into the housing from a radial direction with respect to the driven shaft.

14. The axle drive in accordance with claim 13,
wherein the insertion opening is formed in a base of a fastening recess of the housing, said base being radially inwardly offset relative to an outer border of the fastening recess with respect to the driven shaft.

15. The axle drive in accordance with claim 1,
wherein the output section of the drive shaft and the input section of the driven shaft are coupled drive-wise to one another such that a speed reduction results on the transmission of the drive power from the drive shaft to the driven shaft.

16. The axle drive in accordance with claim 1,
wherein the axle drive is configured to be installed in the vehicle such that the drive shaft is arranged vertically offset from the driven shaft.

17. The axle drive in accordance with claim 1, wherein the input section is an end section of the drive shaft that is formed by a flange for connecting the drive shaft to the electric motor.

18. An axle drive for a vehicle comprising at least one drivable vehicle axle oriented transversely to a longitudinal direction of the vehicle, said axle drive comprising
a drive shaft that extends in parallel with the longitudinal direction of the vehicle and that is configured to receive drive power from an electric motor at an input section and to output said drive power at an output section;
a driven shaft that extends offset from the drive shaft in parallel with the longitudinal direction of the vehicle between a first end and a second end opposite thereto and that is configured to receive drive power from the output section of the drive shaft at an input section and to output said drive power to the vehicle axle via a bevel gear arranged at the first end; and
a brake having a brake disk that is arranged at the second end of the driven shaft and that is arranged between the input section of the drive shaft and the input section of the driven shaft with respect to the longitudinal direction of the vehicle;
wherein the axle drive further comprises a housing in which the drive shaft and the driven shaft are received, wherein the output section of the drive shaft and the input section of the driven shaft are arranged within the housing;
wherein the brake comprises a brake caliper that is fastened to an outer side of the housing;
wherein a reception recess for the brake disk is formed at the housing,
wherein the brake caliper of the brake and the reception recess of the housing are arranged diametrically opposite one another with respect to the driven shaft.

19. An axle drive for a vehicle comprising at least one drivable vehicle axle oriented transversely to a longitudinal direction of the vehicle, said axle drive comprising
a drive shaft that extends in parallel with the longitudinal direction of the vehicle and that is configured to receive drive power from an electric motor at an input section and to output said drive power at an output section;
a driven shaft that extends offset from the drive shaft in parallel with the longitudinal direction of the vehicle between a first end and a second end opposite thereto and that is configured to receive drive power from the output section of the drive shaft at an input section and to output said drive power to the vehicle axle via a bevel gear arranged at the first end; and
a brake having a brake disk that is arranged at the second end of the driven shaft and that is arranged between the input section of the drive shaft and the input section of the driven shaft with respect to the longitudinal direction of the vehicle;
wherein the axle drive further comprises a housing in which the drive shaft and the driven shaft are received, wherein the output section of the drive shaft and the input section of the driven shaft are arranged within the housing;
wherein the brake comprises a brake caliper that is fastened to an outer side of the housing;
wherein a reception recess for the brake disk is formed at the housing,
wherein the axle drive is configured such that the brake disk can be removed without dismantling or opening the housing in that the brake caliper is first released from the housing and is then radially removed from the housing with respect to the driven shaft and the brake disk is released from the second end of the driven shaft and is then radially removed from the reception recess with respect to the driven shaft.

* * * * *